(12) United States Patent
Madzgalla

(10) Patent No.: US 12,553,479 B2
(45) Date of Patent: Feb. 17, 2026

(54) BRAKE CALIPER GUIDE

(71) Applicant: ZF Active Safety GmbH, Koblenz (DE)

(72) Inventor: Lukas Madzgalla, Lahnstein (DE)

(73) Assignee: ZF Active Safety GmbH, Koblenz (DE)

( * ) Notice: Subject to any disclaimer, the term of this patent is extended or adjusted under 35 U.S.C. 154(b) by 491 days.

(21) Appl. No.: 17/978,270

(22) Filed: Nov. 1, 2022

(65) Prior Publication Data
US 2023/0136921 A1 May 4, 2023

(30) Foreign Application Priority Data

Nov. 1, 2021 (DE) .......................... 102021212333.3

(51) Int. Cl.
*F16D 55/2265* (2006.01)
*F16D 55/00* (2006.01)

(52) U.S. Cl.
CPC .. *F16D 55/22655* (2013.01); *F16D 2055/007* (2013.01)

(58) Field of Classification Search
CPC ........... F16D 55/2265; F16D 55/22655; F16D 55/227; F16D 2055/007
See application file for complete search history.

(56) References Cited

U.S. PATENT DOCUMENTS

| | | | |
|---|---|---|---|
| 4,308,938 A | | 1/1982 | Denton |
| 4,685,686 A | * | 8/1987 | Weiler ..................... F16J 15/52 403/50 |

(Continued)

FOREIGN PATENT DOCUMENTS

| | | | | |
|---|---|---|---|---|
| DE | 2919548 A1 | | 2/1980 | |
| DE | 3418805 C2 | * | 2/1996 | ....... F16D 55/22655 |

(Continued)

*Primary Examiner* — Thomas W Irvin
(74) *Attorney, Agent, or Firm* — Kristin L. Murphy

(57) ABSTRACT

The disclosure relates to a brake caliper guide for a floating caliper disk brake, comprising at least one guide pin attached to a brake caliper, having a head and a shaft, a brake carrier having at least one guide bore which has an entry region and a bore depth extending into the brake carrier, and a guide device inserted into the entry region of the guide bore having a sliding sleeve arranged in an elastomer sleeve 40. The shaft of the guide pin is mounted in a longitudinally displaceable manner in the sliding sleeve such that the head is located outside the brake carrier. The region of the shaft which is located on the side of the guide device oriented toward the bore depth projects into the guide bore. The end face of the sliding sleeve which is oriented toward the outer face of the brake carrier has a first collar which extends radially outwardly. The elastomer sleeve overlaps the sliding sleeve and adjoins the first collar and is delimited in the longitudinal extent thereof by this collar, and/or the end face of the sliding sleeve, which is oriented toward the outer face of the brake carrier, has a first collar which extends radially outwardly. The end face of the sliding sleeve has a second collar which extends radially outwardly. The elastomer sleeve is arranged between the first and the second collar and is delimited in the longitudinal extent thereof by the collars.

16 Claims, 4 Drawing Sheets

(56) References Cited

U.S. PATENT DOCUMENTS

| | | | | |
|---|---|---|---|---|
| 4,781,273 | A * | 11/1988 | Fujinami | B61H 5/00 188/73.45 |
| 4,964,490 | A * | 10/1990 | Watanabe | F16D 55/22655 411/320 |
| 5,467,848 | A * | 11/1995 | Knez | F16D 55/22655 188/73.31 |
| 5,632,359 | A * | 5/1997 | Camps | F16D 66/025 188/1.11 R |
| 5,785,156 | A * | 7/1998 | Warwick | F16D 55/227 188/73.32 |
| 5,927,446 | A * | 7/1999 | Evans | F16D 55/227 188/73.44 |
| 6,026,938 | A * | 2/2000 | Demoise, Jr. | F16D 55/22655 188/73.35 |
| 6,135,245 | A * | 10/2000 | Kurasako | F16D 65/54 188/73.45 |
| 6,725,981 | B1 * | 4/2004 | Franz | F16D 55/22655 188/73.31 |
| 8,037,976 | B2 * | 10/2011 | Baumgartner | F16D 55/22655 188/73.31 |
| 10,302,161 | B2 * | 5/2019 | Roberts | F16J 3/02 |
| 11,255,390 | B2 * | 2/2022 | Fischer | F16D 55/22655 |
| 11,982,304 | B2 * | 5/2024 | Wallmeier | F16D 55/22655 |
| 12,044,278 | B2 * | 7/2024 | Jenkins | F16D 65/0006 |
| 2008/0093181 | A1 * | 4/2008 | Waag | F16D 55/22655 188/73.44 |
| 2009/0260928 | A1 * | 10/2009 | Baumgartner | F16D 55/22655 188/73.44 |
| 2017/0335911 | A1 * | 11/2017 | Roberts | F16J 3/02 |
| 2022/0364590 | A1 * | 11/2022 | Wallmeier | F16B 33/02 |
| 2023/0089215 | A1 * | 3/2023 | Jenkins | F16D 65/0087 188/73.44 |
| 2024/0044379 | A1 * | 2/2024 | Zenzen | F16D 65/095 |
| 2025/0020177 | A1 * | 1/2025 | Kim | F16D 65/0025 |
| 2025/0043837 | A1 * | 2/2025 | Leidecker | F16D 55/2265 |

FOREIGN PATENT DOCUMENTS

| | | | | |
|---|---|---|---|---|
| DE | 102008028914 | A1 * | 12/2009 | ....... F16D 55/22655 |
| DE | 102011017220 | A1 | 10/2012 | |
| DE | 102014019113 | A1 * | 6/2016 | ....... F16D 55/22655 |
| DE | 102022208161 | B4 * | 1/2025 | ........... F16D 55/226 |
| JP | S5899526 | A | 6/1983 | |
| JP | H08177897 | A | 7/1996 | |
| JP | H0932871 | A | 2/1997 | |

* cited by examiner

BRAKE CALIPER GUIDE

CROSS-REFERENCE TO RELATED APPLICATION

This application claims priority to German Priority Application No. 102021212333.3, filed Nov. 2, 2021, the disclosure of which is incorporated herein by reference in its entirety.

TECHNICAL FIELD

The disclosure relates to a brake caliper guide for a floating caliper disk brake. Floating caliper disk brakes are widely used in motor vehicles. Floating caliper disk brakes comprise a brake caliper which is displaceable transversely to the brake disk, which is conventionally mounted in an axially displaceable manner by guide pins and guide elements such as guide bushings. In addition to having a guide function, these guide systems are also capable of withstanding and transmitting tangential forces, i.e.—based on a guide pin of this type—radial forces, produced by a braking process. In addition, vibrations produced in the brake are not transmitted, but rather damped by the guide system. Furthermore, it is desirable for the guide to be easy to move.

BACKGROUND

Floating caliper disk brakes comprising corresponding guide systems are known per se from the prior art.

DE 20 2006 006 142 U1 discloses a bellows for the guide pin of a floating-caliper partially lined disk brake, which guides the guide pin in the wall of the guide bore in a damping and sealing manner.

WO 2016/037894 A1 discloses a protective bellows comprising an elastically deformable guide portion which displaceably receives part of the shaft portion of a guide pin. The device is also used to displaceably mount a brake caliper.

EP 2 126 395 B1 discloses a slide bushing, comprising an inner shell and a layer consisting of a resilient material which is in contact with the lateral face thereof and which is overlapped by an outer shell. This outer shell is pressed into a corresponding receiving bore in the brake caliper.

The solutions known from the prior art meet only some of the requirements mentioned.

SUMMARY

What is therefore needed that of providing an easy-to-assemble brake caliper guide for a floating caliper disk brake, which is firstly easy to move, and secondly is capable of providing high tangential forces as well as good damping.

The brake caliper guide according to the disclosure for a floating caliper disk brake comprises at least one guide pin attached to a brake caliper, having a head and a shaft, a brake carrier having at least one guide bore, which has an entry region and a bore depth extending into the brake carrier, and a guide device inserted into the entry region of the guide bore having a sliding sleeve arranged in an elastomer sleeve. An elastomer sleeve of this type can be a sleeve made of any possible elastomer, such as natural rubber, synthetic rubber and vulcanizates.

The shaft of the guide pin is mounted in a longitudinally displaceable manner in the sliding sleeve so that the head is located outside the brake carrier, and the region of the shaft which is located on the side of the guide device oriented toward the bore depth projects into the guide bore.

The end face of the sliding sleeve which is oriented toward the outer face of the brake carrier has a first collar, which extends radially outwardly, wherein the elastomer sleeve overlaps the sliding sleeve and adjoins the first collar and is delimited in the longitudinal extent thereof by this collar.

In addition to the first collar on the end face of the sliding sleeve which is oriented toward the bore depth of the guide bore, in one exemplary arrangement, the sliding sleeve has a second collar which extends radially outwardly. In this case, the elastomer sleeve is arranged between the first and the second collar and is delimited in the longitudinal extent thereof by the collars.

In one exemplary arrangement, the entry region of the guide bore has a specific bore depth and is suitable for receiving cylindrical components, for example, sleeve-shaped components. In one advantageous and exemplary arrangement, the diameter of the entry region is greater than the part of the guide bore which extends further into the brake carrier. The bore depth extending into the brake carrier is preferably in the form of a blind hole.

The elastomer sleeve and the sliding sleeve are arranged so as to be inserted one inside the other. In this case, the sliding sleeve is arranged inwardly, and the elastomer sleeve is arranged on the outside diameter of the sliding sleeve in an attached, pressed-on, adhered-on, cured-on or other manner.

The guide pin and the guide device are longitudinally or axially displaceable relative to one another. The head of the guide pin is used for fixing to the brake caliper. The shaft of the guide pin extends through the guide device, wherein the sliding sleeve forms a sliding bearing for the guide pin or for the shaft. The other part of the shaft or the shaft end projects into the bore extending into the brake carrier.

The radially outwardly extending collars located on the end faces of the sliding sleeve define, together with the sleeve body, that is to say together with a cylindrical outer surface of the sleeve, a receiving region or space for the elastomer sleeve. In the axial direction of the elastomer sleeve or the sliding sleeve, the collars define the longitudinal extent of the elastomer sleeve. In any case, the definition is effective when a force, in particular a radial force, produced as a result of a braking process acts on the guide device. However, the definition takes effect without an external force. There is also a certain amount of definition when the sliding sleeve is provided only with the first collar which is oriented toward the outer face of the brake carrier, since this collar defines or at least restricts the longitudinal extent of the elastomer sleeve out of the guide bore or out of the brake carrier. A definition of the elastomer sleeve on both sides is even more advantageous.

An advantage of the axial definition of the elastomer sleeve lies in the fact that, when subjected to an external force which is produced as a tangential force during a braking process, the material of the elastomer sleeve cannot flow away axially. If there is no axial definition of this type, the elastomer buckles axially, and this results in a high degree of radial movement of the guide pin in the guide device. A high degree of radial movement is disadvantageous, since guide parts, for example, metal guide parts, can come into contact with one another during a large radial deflection. This generates noise—primarily as a result of the then possible transmission of vibrations. In the case of the arrangement according to the disclosure, when tangential forces, which can be considered to be radial forces in relation to the guide pin, occur in the brake, this results in a small radial deflection. In comparison with the prior art, the gradient of the radial force FR as a function of the radial deflection SR is greater in the solution according to the disclosure. Without axial definition, damping elastomer elements can be axially squeezed out. That is to say that the material gives way when radial forces are occurring. In the case of the disclosure, the material is prevented from giving way in this manner. As a result of a large gradient with respect to the radial force based on the deflection, the guide device can be configured in such a way that the elastomer sleeve is preloaded to a limited extent during a small radial deflection. This has an advantageous effect on the required ease of movement of the brake caliper guide and the damping properties. The friction force or the sliding friction force acting between the guide pin or the shaft and the sliding sleeve is then comparatively small. However, as the radial deflection increases, the elastomer sleeve enclosed or delimited between the sliding sleeve collars then develops a quickly growing counterforce. The elastomer sleeve is therefore not radially compressed to the same extent, and unwanted contact between guide parts of the brake caliper guide is prevented.

In one exemplary arrangement, the guide device also comprises a sealing arrangement having a guide pin connection and/or a brake caliper connection, a brake carrier connection and a protective bellows. The sealing arrangement is integrally connected to the elastomer sleeve and, like the elastomer sleeve, includes an elastomer material. In this exemplary arrangement, in a transition region between the elastomer sleeve and the brake carrier connection and/or the protective bellows, the width of the elastomer sleeve protrudes out of the entry region of the guide bore and/or out of the brake carrier. As a result of the integral design, quick assembly is possible, and the bearing points are sealed securely.

In one exemplary arrangement, the entry region has a cylindrical inner surface having an inside diameter D1 which forms a receiving portion for the cylindrical outer surface of the elastomer sleeve. The cylindrical inner surface of the entry region is in contact with the cylindrical outer surface of the elastomer sleeve. The sliding sleeve has an inner sliding side which is in sliding contact with the shaft, and an outer receiving side having an outer surface which is cylindrical at least in part and has an outside diameter D2, which forms a receiving portion for the cylindrical inner surface of the elastomer sleeve. The outer surface of the sliding sleeve which is cylindrical at least in part is preferably in contact with the cylindrical inner surface of the elastomer sleeve. The radial distance between D1 and D2 defines the thickness t of the part of the elastomer sleeve located between the cylindrical inner surface and the cylindrical outer surface when installed. In other words, the thickness t is equal to the difference between the quotient from D1 divided by 2 and the quotient from D2 divided by 2. The transition region or the part of the guide device in the transition region extends at an angle, in one exemplary arrangement, an L shape, with respect to the elastomer sleeve. In other words, in the longitudinal section of the elastomer sleeve, the sleeve body thereof forms an L shape with the thickness t and the angled part.

The dimension of the collar height HB1 of the first sliding sleeve collar in the radial direction, starting from the cylindrical outer surface, is at least equal to the dimension of the thickness t. The dimension of the collar height HB1 is greater than, and in one exemplary arrangement, more at least twice as great as the dimension of the thickness t. The dimension of the collar height HB1 is at least great enough that this collar axially supports the angled transition region, if this is present. The dimension of the collar height HB2 of the second sliding sleeve collar, if such a collar is present, in the radial direction, starting from the cylindrical outer surface, is at least half as great as the dimension of the thickness t. In one exemplary arrangement, at least 0.7 times the size thereof.

Due to the above-mentioned dimensions of the sliding sleeve collars in relation to the thickness of the elastomer sleeve, it is ensured that the elastomer sleeve is held/delimited in an axially secure manner, and when a radial force is acting on the guide device, the sleeve is prevented from being axially squeezed out.

The inner sliding side can comprise a connecting piece protruding out of the sliding sleeve or a plurality of connecting pieces protruding out of the sliding sleeve which is/are in sliding contact with the shaft. In this case, the sliding connecting pieces are in the form of radially circumferential connecting pieces. The sliding sleeve which is only partially in contact with the surface of the shaft ensures good sliding properties long term, prevents seizing up, and allows a good supply/distribution of lubricant. The sliding connecting pieces can be produced by shaping.

In one exemplary arrangement, the sliding sleeve has a slot oriented in the axial direction of the sleeve, which is in the form of a continuous slot. In one exemplary arrangement, this slot can advantageously be accommodated by manufacturing tolerances. The slot further makes it possible to design the guide device in such a way that this device or the sliding sleeve sits or runs on the shaft of the guide pin with a preload. When not mounted, the inside diameter of the sliding sleeve is accordingly smaller than the outside diameter of the guide pin shaft. By inserting the shaft into the sliding sleeve, this sleeve is then pressed apart slightly. The guide system is thus preloaded. With this exemplary arrangement, it is possible to easily insert the guide device together with the outer elastomer sleeve in the not-yet-preloaded state into the entry region of the guide bore. After the guide device has been inserted into the entry region, the shaft of the guide pin can be inserted through the sliding sleeve. In this process, the guide system can be preloaded with zero clearance overall. The elastomer sleeve is thus also pressed against the bore wall in the entry region. The elastomer sleeve is prevented from being axially squeezed out by the sliding sleeve collars or, depending on the design, by the first sliding sleeve collar.

In one suitable exemplary arrangement, both the shaft and the sliding sleeve are produced from metal, or the shaft and the sliding sleeve include metal so that there is a metal-on-metal sliding pair.

A metal sliding sleeve of this type may be produced from a sheet-like material. The first collar and/or the second collar preferably have a material thickness of at least 0.3 mm. In one exemplary arrangement, the material thickness may be at least 0.5 mm. In one further exemplary arrangement, the material thickness may be at least 1 mm.

In one exemplary arrangement, the guide device can encapsulate the bearing point which is formed by the sliding sleeve, and likewise or alternatively the bore depth extending into the brake carrier. The bearing point which is formed by the sliding sleeve, and/or the bore depth extending into the brake carrier, may be lubricated. In one exemplary arrangement, this lubrication is a lifetime lubrication. The sliding connecting pieces already described above support the distribution of lubricant in the guide device.

The region of the shaft which is located on the side of the guide device oriented toward the bore depth and projects into the guide bode, can comprise at least one guide arrangement by which the guide pin is mounted in a longitudinally displaceable manner in the region of the bore depth extending into the brake carrier. This thus results in two bearing points for the guide pins. At these two bearing points, the transmission of the forces produced during the operation of the brake takes place, the radial forces are transmitted only by these bearings. As a result of the comparatively large gradient of the guide device according to the disclosure with respect to the radial force based on the deflection, the guide device, or the associated sleeves can have a comparatively short design in the axial direction. This makes it easier to assemble the guide components.

In one exemplary arrangement, the shaft is at least twice the length of the sliding sleeve, and in one exemplary arrangement, at least three times, and in yet a further exemplary arrangement, at least four times the length thereof. In the case of such exemplary arrangement, the rigidity of the guide system, which increases greatly as the radial deflection increases, and the greatly increasing radial counterforce which results, as already explained, from the definition of the axial extent of the elastomer sleeve, are also advantageous. As a result of this rigidity, the guide system is also capable of transmitting possible bending loads (as a result of larger braking components, e.g. the brake caliper), which act on the guide device, in such a way that there is no unwanted contact between guide elements.

In the preceding description, a brake caliper guide is described in which the guide bore is introduced into the brake carrier, and the guide pin is attached to the displaceable brake caliper. However, the solution according to the disclosure is alternatively also suitable for a brake caliper guide in which the guide bore is introduced in the movable brake caliper, and in which the guide pin is fixed to the brake carrier. All of the possible exemplary arrangements described above thus also apply to this alternative brake caliper guide. The description above is thus also applicable thereto, except that, when reading about the indicated components and construction elements and the respective arrangement and assignment thereof in the brake caliper guide, the brake caliper must replace the brake carrier, and the brake carrier must replace the brake caliper. Another description of all the possible exemplary arrangements can thus be omitted.

It is also understood per se that the brake caliper guide according to the disclosure can also comprise two or more of the described guide components (guide pin, guide bore, etc.) which each interact as described above.

BRIEF DESCRIPTION OF DRAWINGS

The disclosure will be described in greater detail below with reference to the accompanying schematic drawings. This description is the explanation of one exemplary arrangement. For the sake of clarity, not all the elements shown in a drawing are necessarily provided with a reference sign. However, corresponding elements or regions are then labeled at least in another drawing, and the meaning can be found therein.

DETAILED DESCRIPTION

Figure 1:
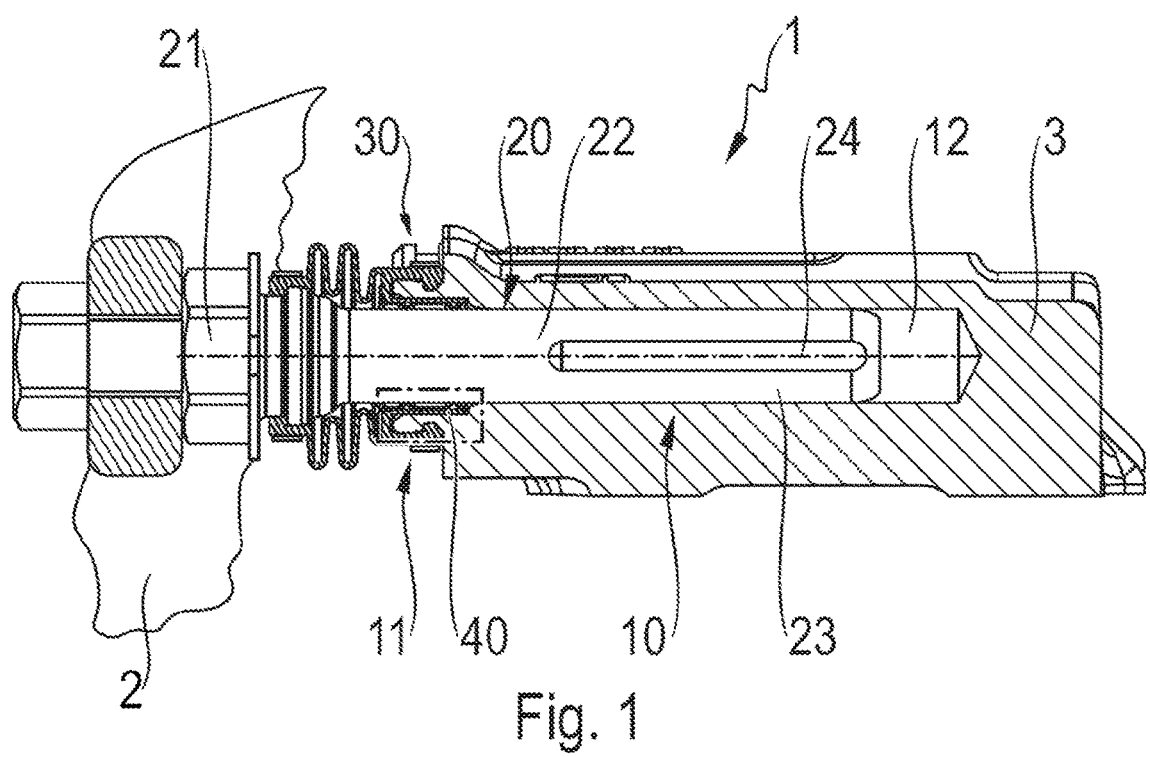
FIG. 1 is a sectional view of the brake caliper guide.
Figure 2:
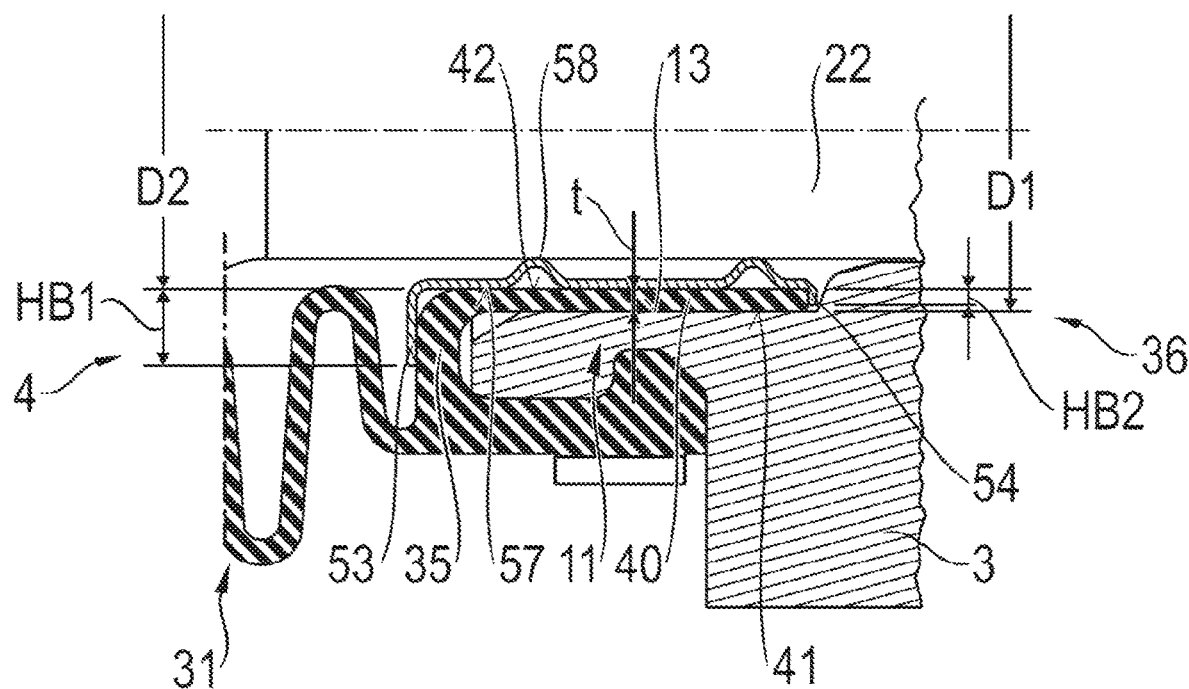
FIG. 2 is an enlarged detail of the brake caliper guide shown in FIG. 1.
Figure 3:
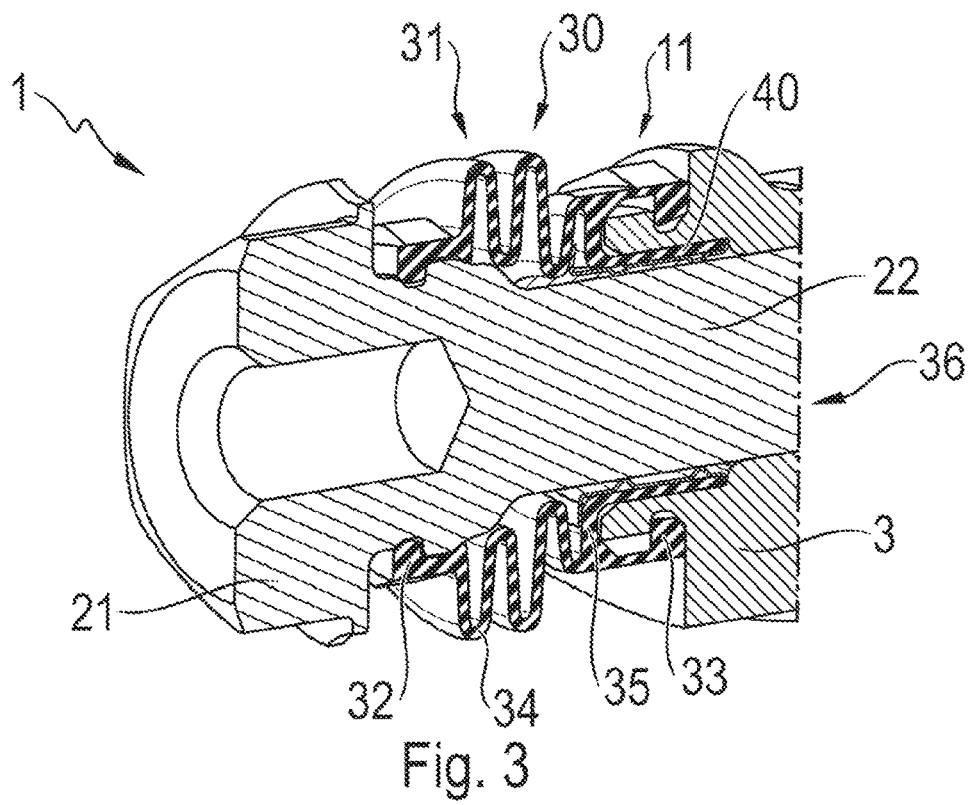
FIG. 3 is a perspective sectional view of the region of the guide device.
Figure 4:
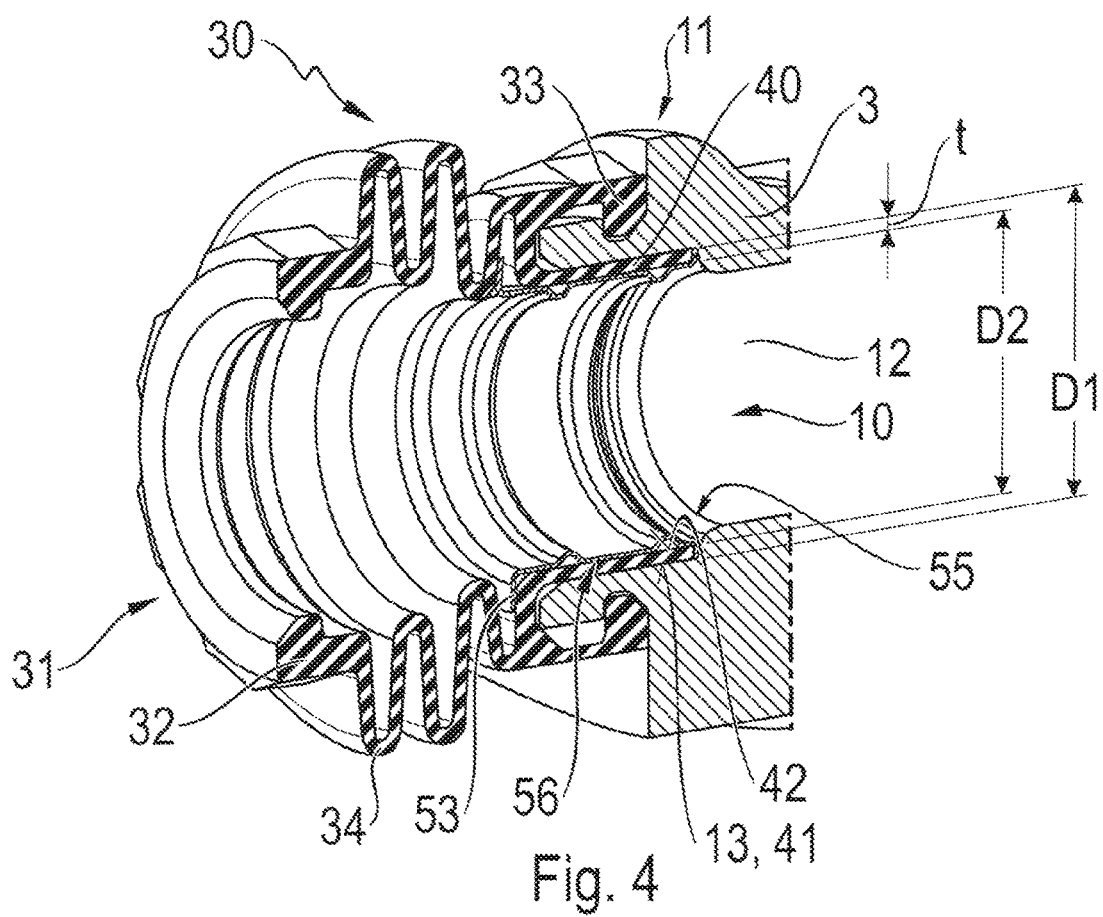
FIG. 4 shows the guide device without guide pins.
Figure 5:
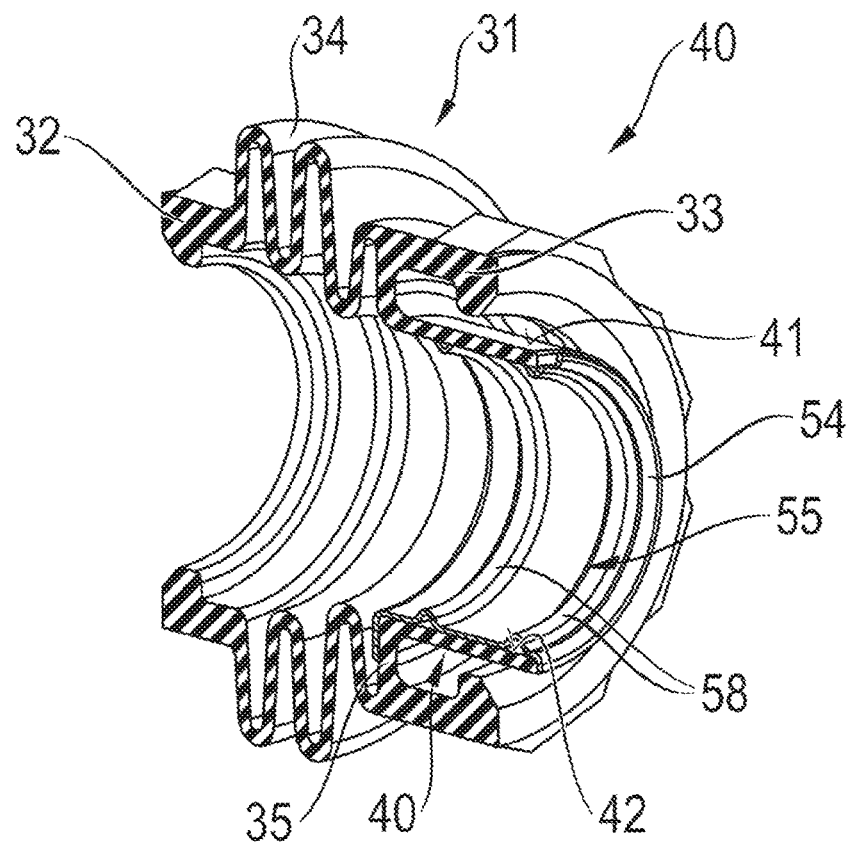
FIG. 5 shows the guide device.

As can be seen in FIGS. 1 to 4, in an exemplary arrangement, the brake caliper 2 is mounted so as to be axially displaceable with respect to the brake carrier 3 by two guide pins 20 (as a result of the sectional view, only one guide pin is shown) which are each guided in a guide device 30. The guide devices 30 are each inserted into the entry region 11 of a guide bore 10. The guide bore 10 extends in the form of a blind hole from the outer face 4 of the brake carrier 3 with a bore depth 12 thereinto. The entry region 11 has a greater diameter D1 in comparison with the bore diameter of the rest of the guide bore 10, which is used as a seat for the guide device 30. The guide device 30 has a sliding sleeve 50, an elastomer sleeve 40 and a sealing arrangement 31. The elastomer sleeve 40 and the sealing arrangement 31 includes an elastomer material and are integrally interconnected by a transition region 35. When viewed in the longitudinal section of the guide device 30 (see for example FIG. 2), the transition region 35 extends radially outwardly as an extension of the elastomer sleeve 40 at an angle of 90° (in an L shape) to the longitudinal extent of the elastomer sleeve. While the elastomer sleeve 40 is located inside the entry region 11, the transition region 35 protrudes out of the entry region 11 and transitions into parts of the sealing arrangement 31 described in the following. As can be seen in FIGS. 3 to 5, the sealing arrangement 31 comprises a guide pin connection 32, to which the arrangement is fixed in a sealing manner on the guide pin head 21, and a brake carrier connection 33, to which the arrangement is fixed in a sealing manner on the brake carrier 3. The guide pin connection 32 and the brake carrier connection 33 are interconnected by a protective bellows 34.

According to for example FIGS. 2 and 4, the guide device 30 is inserted into the entry region 11 of the guide bore 10 in such a way that the cylindrical inner surface 13 of the entry region 11, with the inside diameter D1, is in contact with the cylindrical outer surface 41 of the elastomer sleeve. The elastomer sleeve 40 has a cylindrical inner surface 42 and a cylindrical outer surface 41 and has a specific length. The sliding sleeve 50 has an inner sliding side 55 and an outer receiving side 56 having a cylindrical outer surface 57 with an outside diameter D2 which forms a receiving portion for the cylindrical inner surface 42 of the elastomer sleeve. The cylindrical outer surface 57 of the sliding sleeve 50 is in contact with the cylindrical inner surface 42 of the elastomer sleeve. The radial distance between the dimension reference lines of the dimensions D1 and D2 defines the thickness t of the part of the elastomer sleeve 40 located between the cylindrical inner surface 13 of the guide bore and the cylindrical outer surface 57 of the gliding sleeve 50 when installed.

The sliding sleeve 50 comprises, on the end faces thereof, in each case one collar 53, 54 extending radially outwardly. The possible longitudinal extent of the elastomer sleeve 40 is delimited by the two collars 53, 54, since the sleeve is arranged in the receiving region of the sliding sleeve 50 between these collars. The collars can be seen particularly well in FIGS. 2 and 6.

The first collar 53 is arranged on the end face 51 which is oriented toward the outer face of the brake carrier. The second collar 54 is arranged on the end face 52 which is oriented toward the bore depth 12 of the guide bore 10.

The dimension of the collar height HB1 of the first sliding sleeve collar 53 in the radial direction, starting from the cylindrical outer surface 57, is approximately three times as great as the dimension of the thickness t, and therefore this collar 53 axially supports the angled transition region. The dimension of the collar height HB2 of the second sliding sleeve collar 54 in the radial direction, starting from the cylindrical outer surface 57, is approximately 0.7 times the size of the dimension of the thickness t, and therefore this collar 54 axially supports the inner end of the elastomer sleeve 40.

The guide pins 20 each have a head 21 and a shaft 22. The head 21 is fixed to the movable brake caliper 2. The shaft 22 is mounted in the sliding sleeve 50 in an axially displaceable manner. In this case, the outside diameter of the shaft 22 is in sliding contact with the inner sliding side 55 of the sliding sleeve 50. In this case, two radially circumferential sliding connecting pieces 58 form the sliding contact points. The shaft end 23 of the shaft 22 projects into the bore depth 23 of the guide bore 10 and is likewise guided in the guide bore 10 in an axially displaceable manner by a guide means 24.

The axial support or definition, produced by the sliding sleeve collars, of an axial longitudinal extent of the elastomer sleeve 40 means that in the case of a radial force acting on the guide system and a resulting radial deflection of the guide pin 20 in the guide device 30, the reaction force FR that the guide device 30 exerts on the guide pin 20 greatly increases, and an overly great radial deflection and thus unwanted contact between other guide parts is prevented. In this case, it is decisive that the elastomer sleeve 40, which is received in the receiving region of the sliding sleeve between the collars 53, 54 and allows rigid guidance of the guide pin 20 in the radial direction between the guide bore 10, 11 and the sliding sleeve 50. In the case of low radial forces, the elastomer sleeve 40, in the predominantly relaxed state, in turn allows good damping and low sliding frictional force between the guide pin 20 and the sliding sleeve 50. The good sliding quality is supported by a metal-on-metal sliding friction pair. In other words, both the sliding sleeve 50 and the guide pin 20 are produced from metal.

The shaft 22 is approximately five times the length of the sliding sleeve 50. In other words, the length of the elastomer sleeve 40 can be designed to be short in comparison with the overall dimensions of the brake caliper guide 1 as a result of the rigidity thereof in the event of radial forces.

Figure 6:
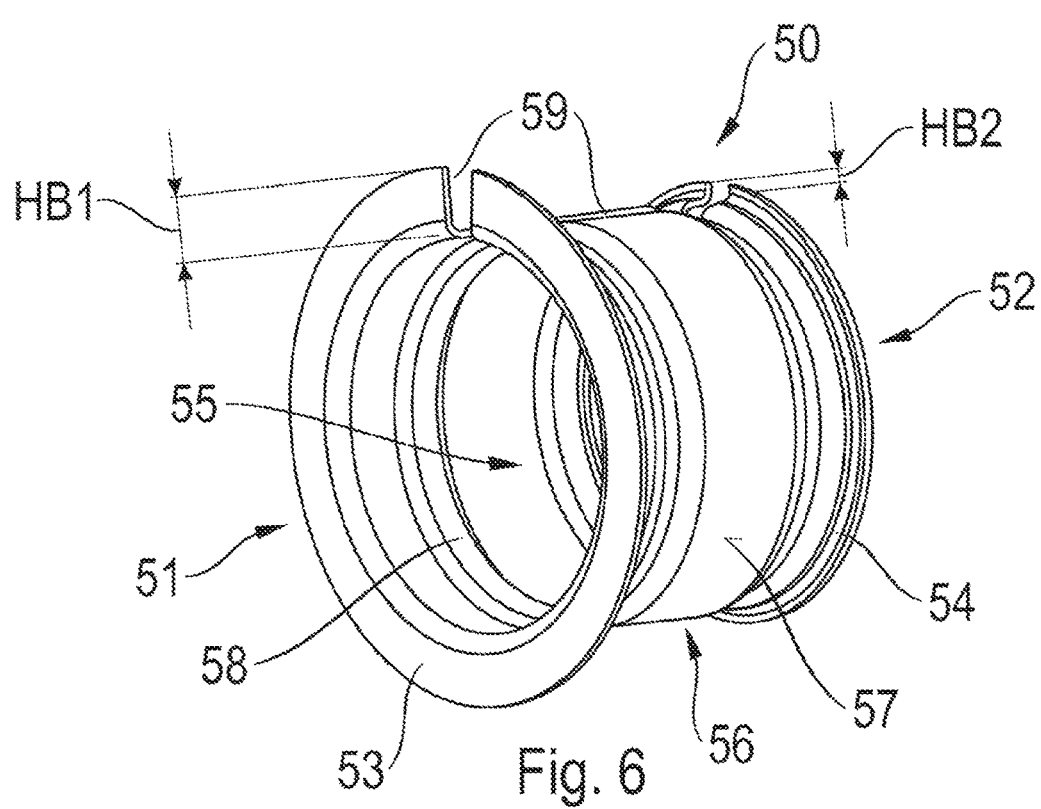
FIG. 6 shows the sliding sleeve.

As can be seen in FIG. 6, the sliding sleeve 50 is provided with a continuous longitudinal slot 59. The longitudinal slot is used firstly to compensate for production tolerances, and secondly the sliding sleeve 50 and the longitudinal slot 59 thereof are designed in such a way that when the shaft 22 is introduced through the sliding sleeve, this sleeve is radially spread apart and thus preloaded. The elastomer sleeve 40 is thus likewise radially preloaded, and the outside diameter thereof is enlarged. In other words, when not preloaded, the guide device can be inserted into the guide bore 10 or into the entry region 11 more easily. When inserting the guide pin 20 or the shaft 22 through the sliding sleeve 50, this sleeve is preloaded, and the outer surface 41 of the elastomer sleeve 40 is pressed onto the cylindrical inner surface 13 of the entry region 11 in such a way that the guide device 30 is securely fixed in the guide bore 10. The higher coefficient of friction which acts in the seat between the outer surface 41 of the elastomer sleeve 40 and the cylindrical inner surface 13 of the entry region 11 in comparison with the sliding friction pair of the sliding sleeve 50 and the guide pin shaft 22 also contributes to secure fixing.

Figure 7:
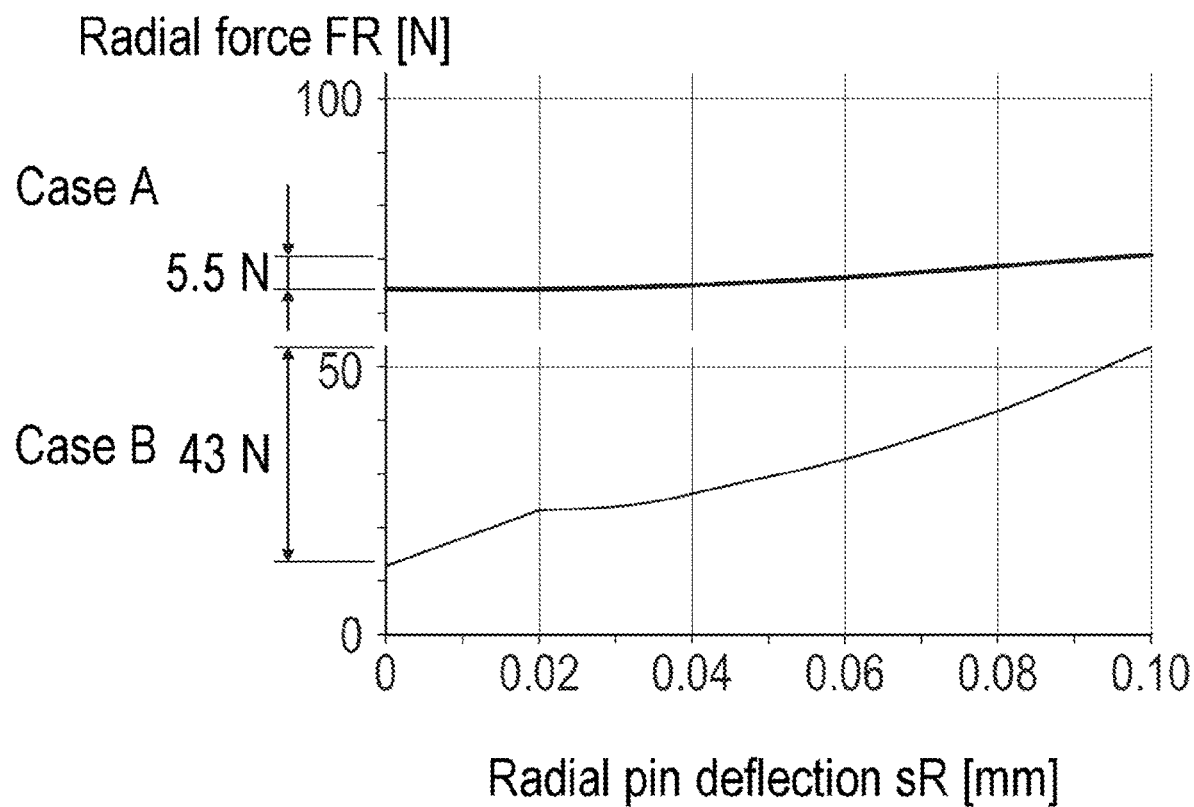
FIG. 7 shows diagrams with path (SR)—force (FR)—progressions.

FIG. 7 shows force progressions of the radial force and a corresponding reaction force FR as a function of the radial guide pin deflection SR in two diagrams. The information is based on the respective use of an elastomer sleeve having a SHORE A hardness of 50. The case A illustrated shows the force progression when using an elastomer sleeve without axial definition. Case B shows the force progression when using the axially defined elastomer sleeve according to the disclosure. In this case, the maximum absolute radial forces to be achieved are not that important. These can be adapted by selecting the degree of hardness. It is more relevant that the gradient of the force progression of the radial force FR as a function of the radial deflection SR in the solution according to the disclosure is substantially greater than in a solution without axial definitions of the elastomer sleeve. In the case of a small pin deflection SR, this force progression results in low frictional forces and good sliding properties. In the case of large pin deflections SR, the required guiding rigidity is achieved by the high increase in the reaction force.

The invention claimed is:

1. A brake caliper guide for a floating caliper disk brake, comprising:
   at least one guide pin attached to a brake caliper, having a head and a shaft,
   a brake carrier having at least one guide bore which has an entry region and a bore depth extending into the brake carrier, and
   a guide device inserted into the entry region of the guide bore having a sliding sleeve arranged in an elastomer sleeve,
   wherein the shaft of the guide pin is mounted in a longitudinally displaceable manner in the sliding sleeve in such a way that the head is located outside the brake carrier, and a region of the shaft which is located on a side of the guide device oriented toward the bore depth projects into the guide bore,
   wherein the sliding sleeve comprises a cylindrical metal sleeve having an inner sliding side in direct sliding contact with the shaft and an outer receiving side having a cylindrical outer surface, wherein an end face of the sliding sleeve which is oriented toward an outer face of the brake carrier has a first collar which extends radially outwardly, and wherein an end face of the sliding sleeve which is oriented toward the bore depth of the guide bore has a second collar which extends radially outwardly wherein the cylindrical metal sleeve further comprises a continuous slot oriented in an axial direction of the sleeve, the slot configured to permit the sliding sleeve to expand radially upon insertion of the shaft to create a preloaded zero-clearance fit, the continuous slot extending an entirety of the cylindrical metal sleeve,
   wherein the elastomer sleeve is arranged between the first and the second collar and is axially constrained in longitudinal extent thereof by the collars such that during radial loading of the guide pin, the elastomer sleeve is prevented from axial displacement and provides a non-linear force response characterized by a progressively increasing radial reaction force as radial deflection increases.

2. The brake caliper guide according to claim 1,
   wherein the guide device comprises a sealing arrangement having a guide pin connection and/or a brake caliper connection, a brake carrier connection and a protective bellows, which is integrally connected to the elastomer sleeve and, like the elastomer sleeve, includes an elastomer material, wherein, in a transition region between the elastomer sleeve and the brake carrier connection and/or the protective bellows, a width of the elastomer sleeve protrudes out of the entry region of the guide bore and/or out of the brake carrier.

3. The brake caliper guide according to claim 1, wherein a transition region extends at an angle with respect to the elastomer sleeve, wherein a dimension of the collar height of the first collar in a radial direction, starting from the cylindrical outer surface, is at least equal to the dimension of the thickness.

4. The brake caliper guide according to claim 3, wherein the inner sliding side has at least one connecting piece protruding out of the sliding sleeve, wherein the at least one connecting piece is in sliding contact with the shaft.

5. The brake caliper guide according to claim 1, wherein the guide device encapsulates a bearing point which is formed by the sliding sleeve, and/or the bore depth extending into the brake carrier.

6. The brake caliper guide according to claim 1, wherein the region of the shaft which is located on the side of the guide device oriented toward the bore depth and projects into the guide bore, comprises at least one guide arrangement by which the guide pin is mounted in a longitudinally displaceable manner in a region of the bore depth extending into the brake carrier.

7. The brake caliper guide according to claim 1, wherein the shaft is at least twice a length of the sliding sleeve.

8. The brake caliper guide according to claim 1, wherein the entry region has a cylindrical inner surface having an inside diameter which forms a receiving portion for a cylindrical outer surface of the elastomer sleeve and is in contact with the cylindrical outer surface of the elastomer sleeve, wherein the sliding sleeve has an inner sliding side in sliding contact with the shaft and an outer receiving side having an outer surface which is cylindrical at least in part and has an outside diameter, which forms a receiving portion for an cylindrical inner surface of the elastomer sleeve and is in contact with the cylindrical inner surface of the elastomer sleeve,
wherein the radial distance between the inner diameter and the outer diameter defines a thickness of a part of the elastomer sleeve which is located between the cylindrical inner surface and the cylindrical outer surface when installed,
wherein a transition region extends at an angle with respect to the elastomer sleeve,
wherein a dimension of the collar height of the first collar in a radial direction, starting from the cylindrical outer surface, is greater than this dimension.

9. The brake caliper guide according to claim 1, wherein the entry region has a cylindrical inner surface having an inside diameter which forms a receiving portion for a cylindrical outer surface of the elastomer sleeve and is in contact with the cylindrical outer surface of the elastomer sleeve,
wherein the sliding sleeve has an inner sliding side in sliding contact with the shaft and an outer receiving side having an outer surface which is cylindrical at least in part and has an outside diameter, which forms a receiving portion for an cylindrical inner surface of the elastomer sleeve and is in contact with the cylindrical inner surface of the elastomer sleeve, wherein the radial distance between the inner diameter and the outer diameter defines a thickness of a part of the elastomer sleeve which is located between the cylindrical inner surface and the cylindrical outer surface when installed,
wherein a transition region extends at an angle with respect to the elastomer sleeve, and wherein the dimension of the collar height is at least great enough that this collar axially supports the angled transition region.

10. The brake caliper guide according to claim 1, wherein the entry region has a cylindrical inner surface having an inside diameter which forms a receiving portion for a cylindrical outer surface of the elastomer sleeve and is in contact with the cylindrical outer surface of the elastomer sleeve,
wherein the sliding sleeve has an inner sliding side in sliding contact with the shaft and an outer receiving side having an outer surface which is cylindrical at least in part and has an outside diameter, which forms a receiving portion for an cylindrical inner surface of the elastomer sleeve and is in contact with the cylindrical inner surface of the elastomer sleeve, wherein the radial distance between the inner diameter and the outer diameter defines a thickness of a part of the elastomer sleeve which is located between the cylindrical inner surface and the cylindrical outer surface when installed,
wherein a transition region extends at an angle with respect to the elastomer sleeve, and wherein the dimension of the collar height of the second sliding sleeve collar in the radial direction, starting from the cylindrical outer surface, is at least half the size of the dimension of the thickness.

11. The brake caliper guide according to claim 10, wherein the inner sliding side has at least one connecting piece protruding out of the sliding sleeve, wherein the at least one connecting piece is in sliding contact with the shaft.

12. The brake caliper guide according to claim 11, wherein the at least one sliding connecting piece is in the form of a radially circumferential connecting piece.

13. The brake caliper guide according to claim 10, wherein the sliding sleeve has a slot oriented in an axial direction of the sleeve.

14. The brake caliper guide according to claim 10, wherein the region of the shaft which is located on the side of the guide device oriented toward the bore depth and projects into the guide bore, comprises at least one guide arrangement by which the guide pin is mounted in a longitudinally displaceable manner in a region of the bore depth extending into the brake carrier.

15. The brake caliper guide according to claim 10, wherein the shaft is at least twice a length of the sliding sleeve.

16. The brake caliper guide according to claim 1, wherein the guide device encapsulates a bearing point which is formed by the sliding sleeve and/or the bore depth extending into the brake carrier and is lubricated.

\* \* \* \* \*